May 24, 1960
R. W. WINSTON
2,937,646
SHEET FILING EQUIPMENT
Filed Sept. 26, 1956
6 Sheets-Sheet 1
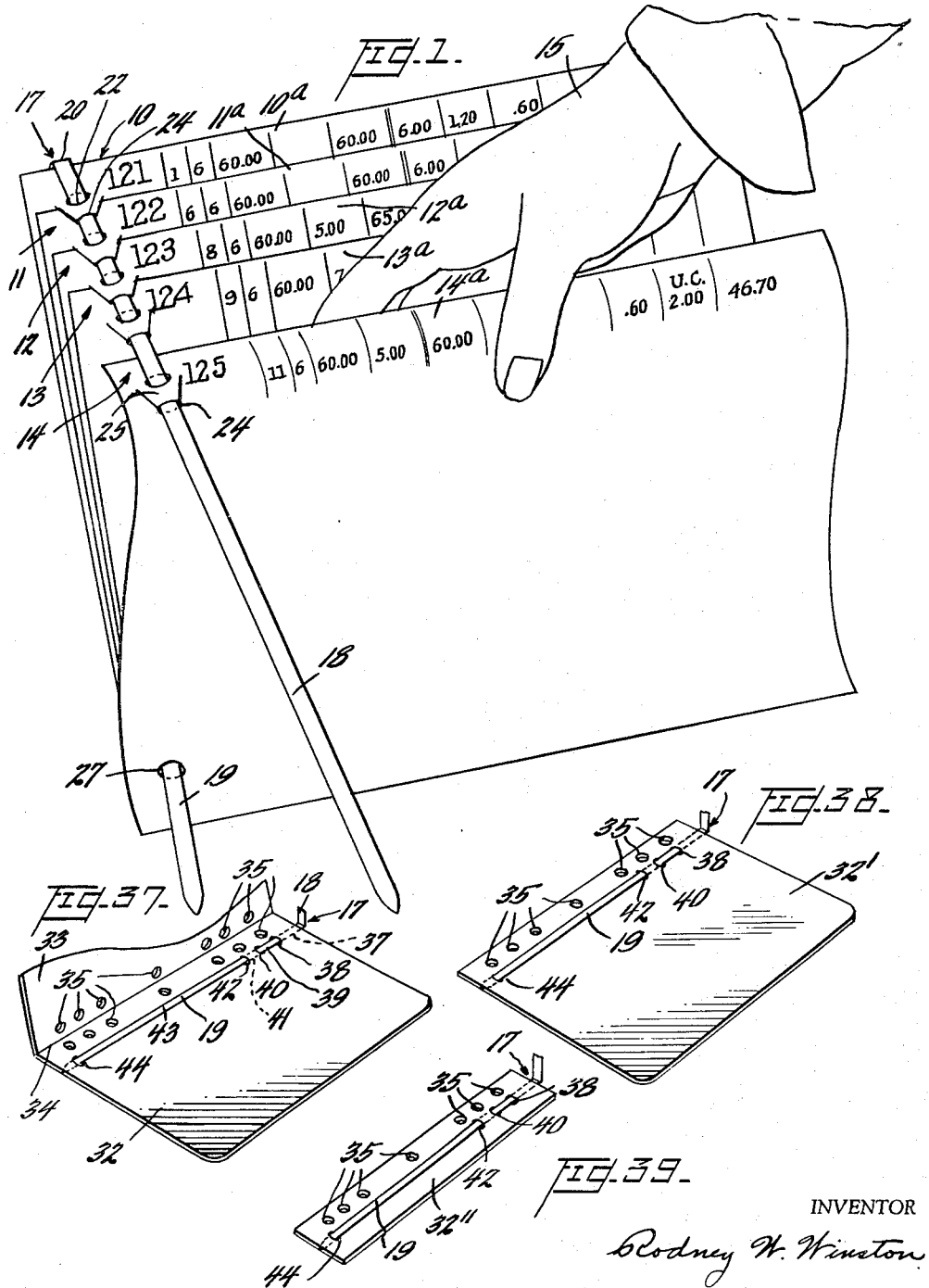
INVENTOR
Rodney W. Winston
BY Watson, Cole, Grindle & Watson
ATTORNEYS

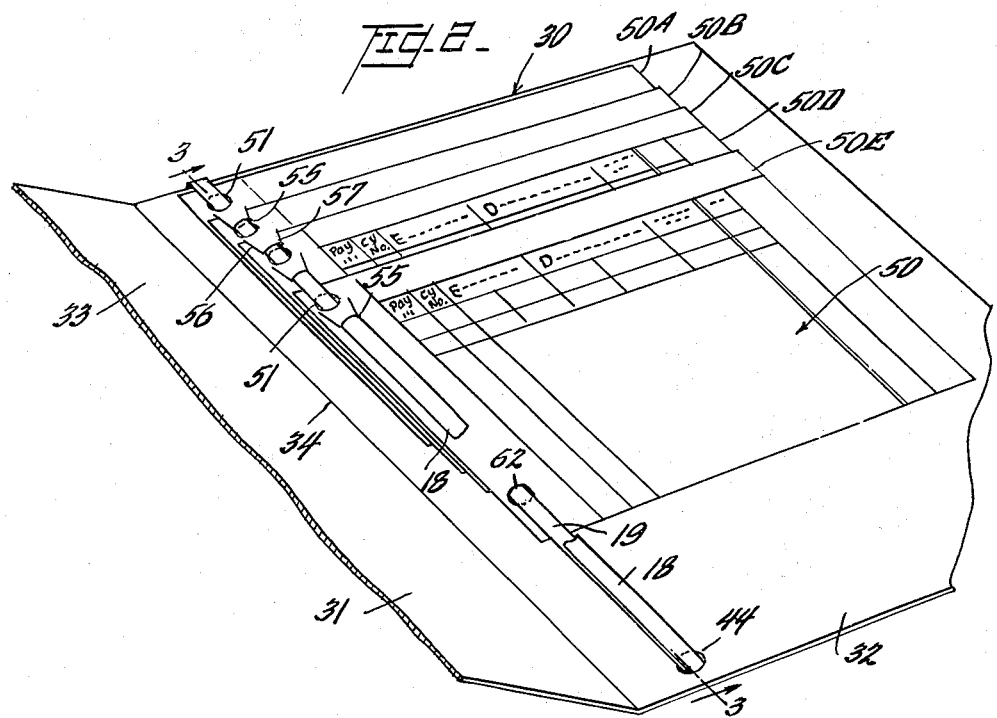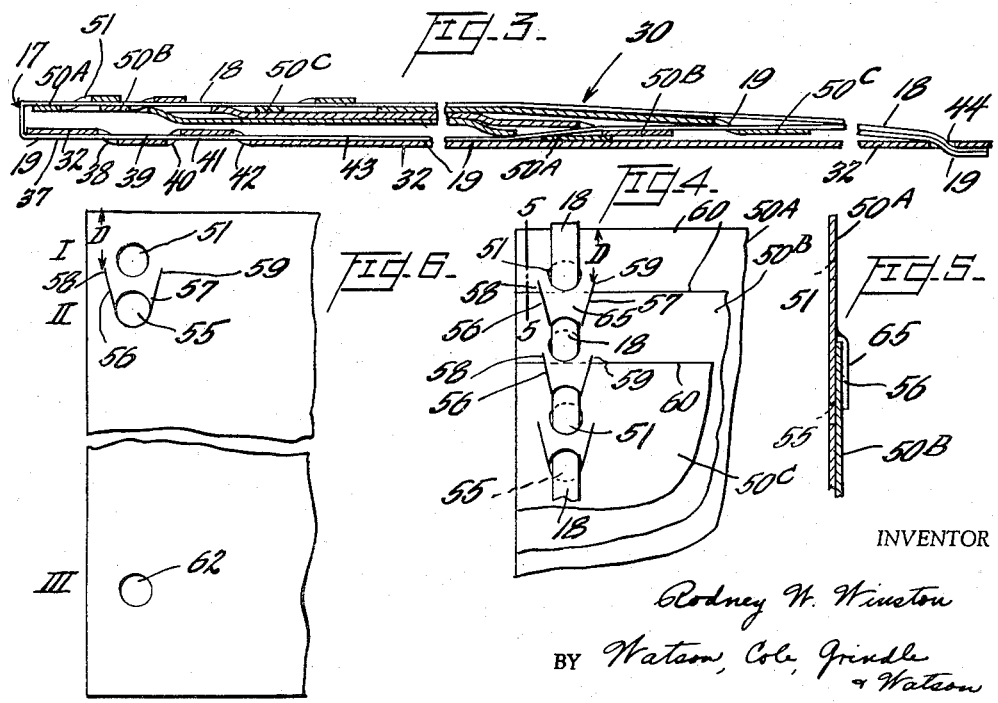

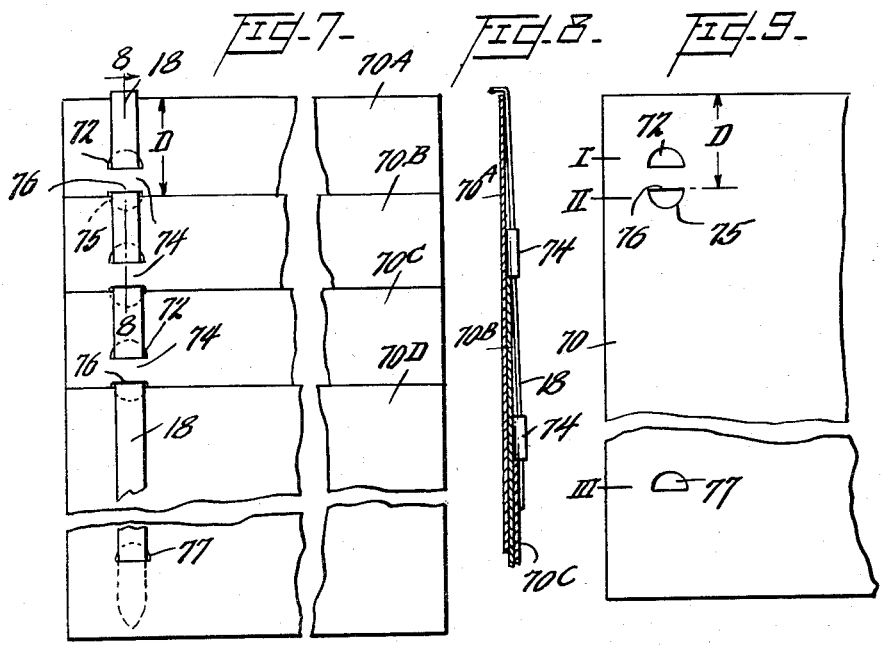
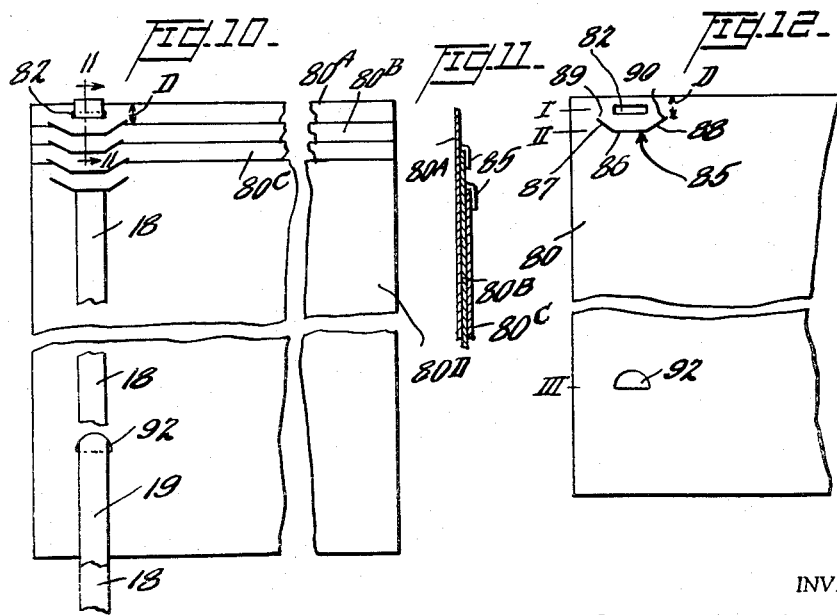

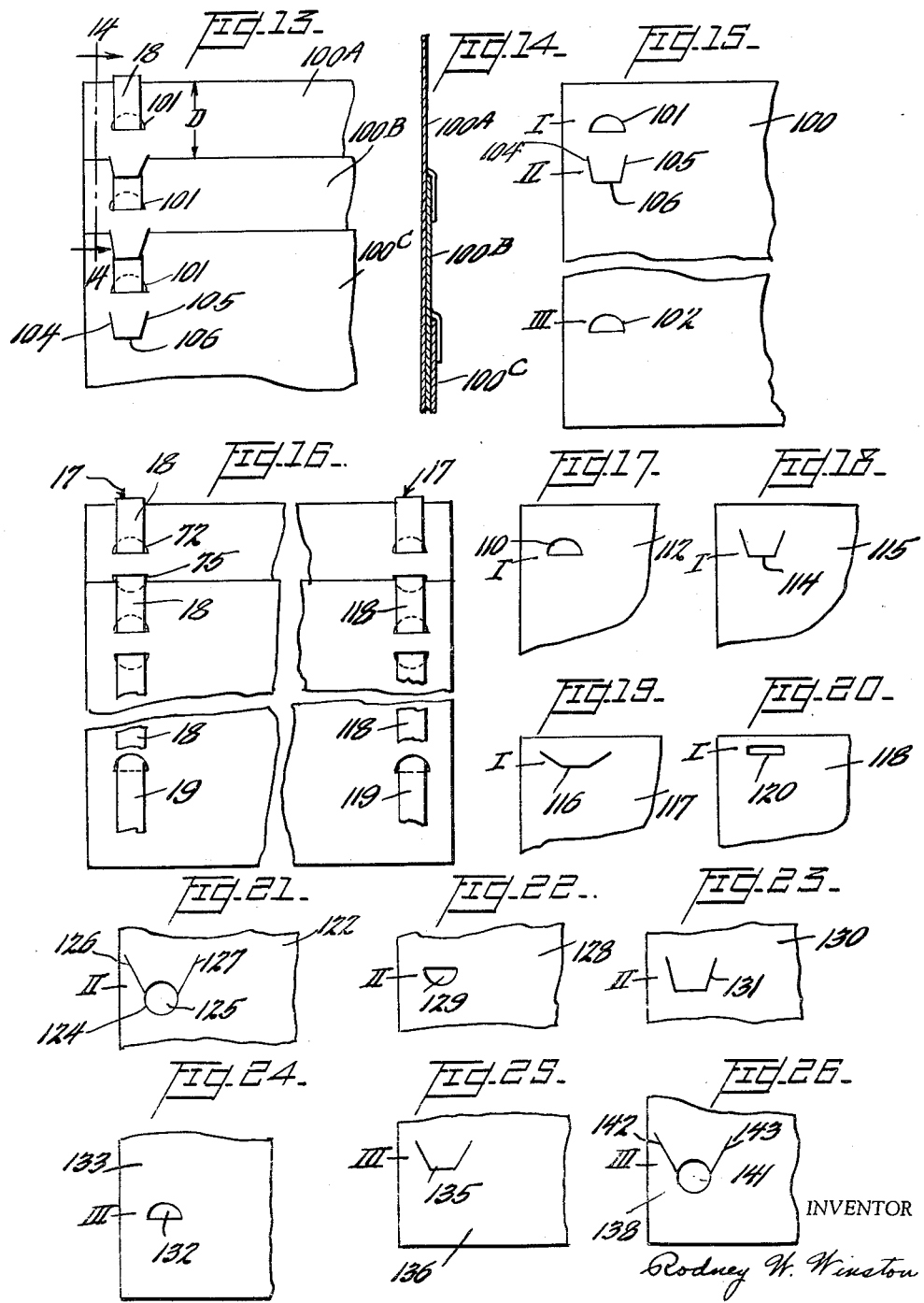

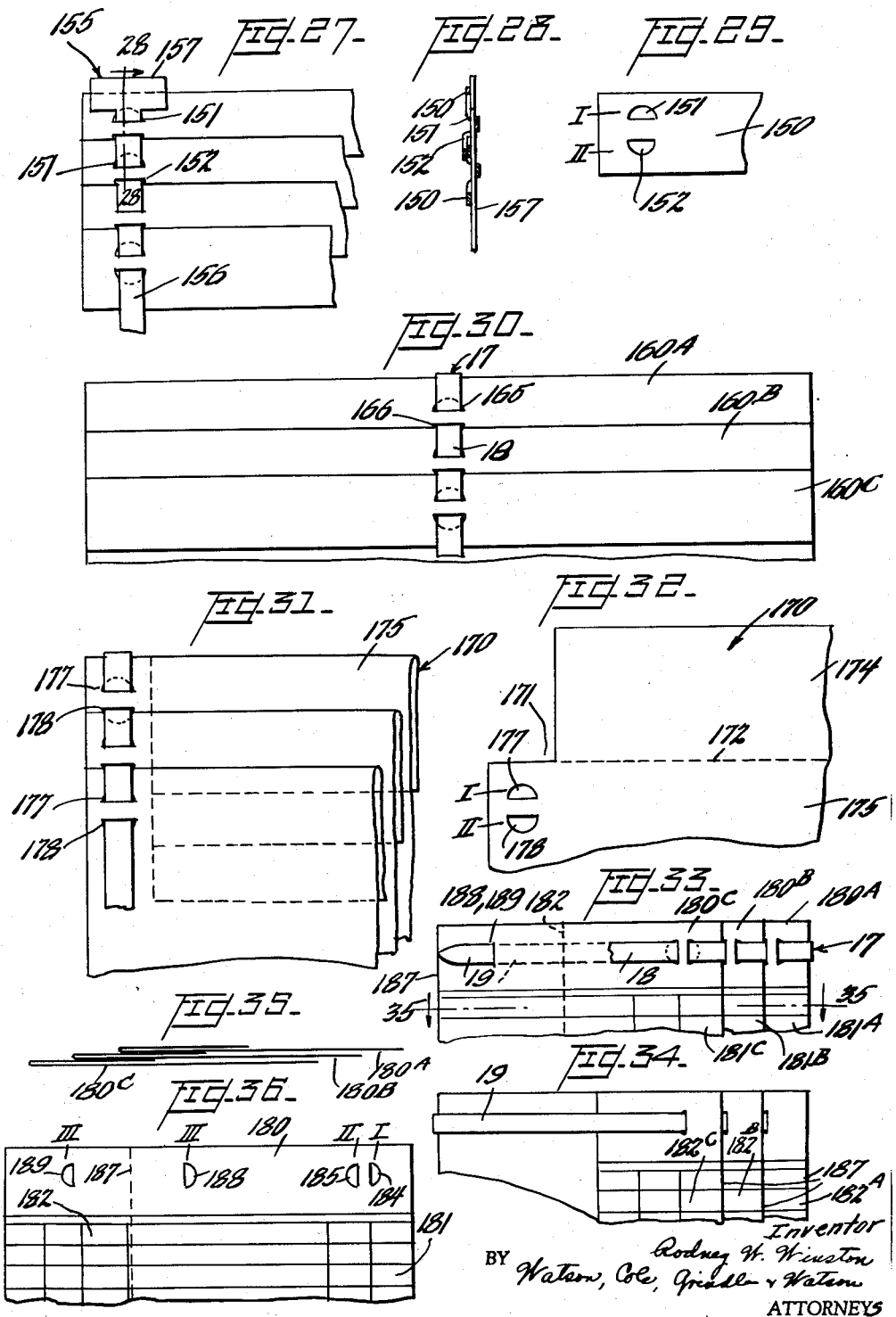

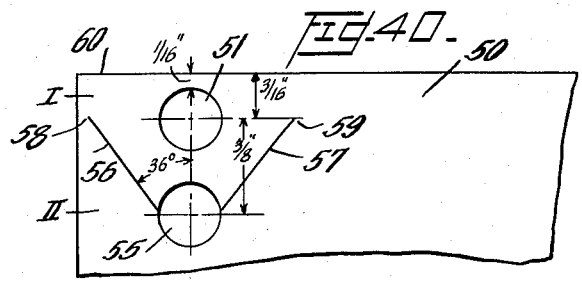
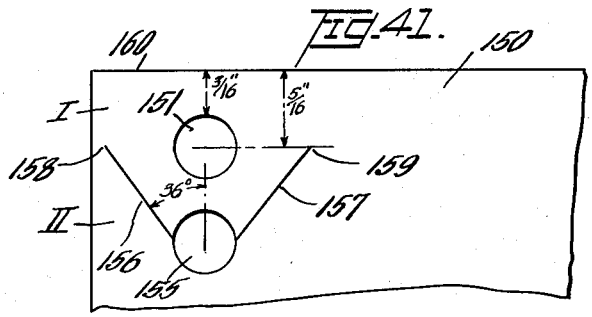
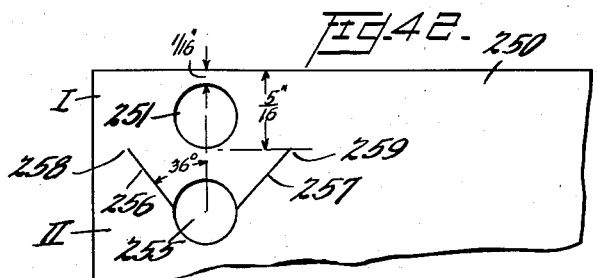
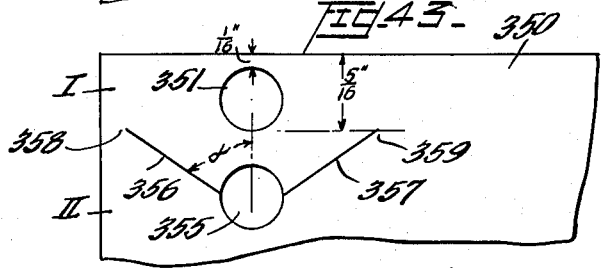
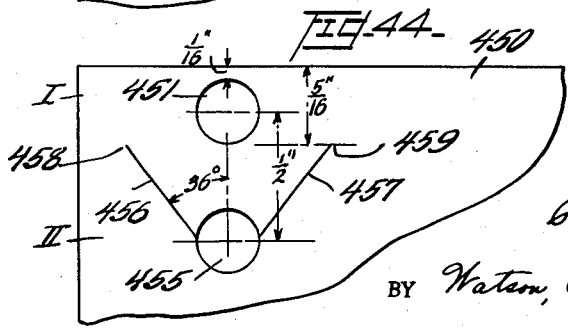

United States Patent Office 2,937,646
Patented May 24, 1960

2,937,646

SHEET FILING EQUIPMENT

Rodney W. Winston, Berkeley, Calif., assignor to Moore Business Forms, Inc., Emeryville, Calif., a corporation of Delaware Filed Sept. 26, 1956, Ser. No. 612,278

3 Claims. (Cl. 129—16)

This invention relates to filing systems and more particularly to systems which are known as "shingle filing," wherein the sheets of business forms or other intelligence bearing material are secured together in overlapping relationship whereby indicia or data inscribed on certain portions of all of the sheets may be exposed to view at the same time.

Such filing arrangements are widely employed for analyzing and tabulating many kinds of data as required in today's business operations and afford means for visual filing of records for quick reference and for follow-up purposes. In order to more fully demonstrate the advantages of the present invention, several types of shingle filing now extant will be briefly mentioned.

One of these prior devices is known as a "pegboard" and comprises a board on which is rigidly and permanently mounted a row of equally spaced pegs or posts. Ring binders have also been used, while another and still less satisfactory device is a clamp-type board which embodies spring clamps for holding unpunched record sheets.

Marked disadvantages have been revealed in experiences with these prior devices, most of which are not only rather bulky and sometimes awkward to use, but also relatively complicated mechanically, which introduces the liability of working parts getting out of order with resulting serious delays to business operations. Another disadvantage is the necessity of excessive disfiguration of the record forms by the provision of large numbers of apertures along the margins.

Another drawback involved in the use of all of these devices is the risk of accidentally placing the record forms incorrectly on the pegs or rings or in the clamps of the clamp-board.

Then too, in the case of ring binder devices, the margins of the apertures are subject to wear and tearing which disrupt or enlarge these openings.

Probably the greatest handicap of these prior devices is their high cost, which has deterred many larger companies from extending shingle filing to all of their business records and transactions, and has prevented smaller concerns from adopting the systems at all.

Therefore, the general object of the present invention is to provide novel and improved methods of and apparatus for shingle filing, and also novel and efficient structural modifications of the forms employed in this general system, all whereby the already recited disadvantages of the prior systems and others which may appear as the description proceeds, are obviated.

The invention in its preferred embodiment contemplates the provision of a backing member which may assume a wide variety of styles.

Suitably secured to or supported by the backing member is a relatively stiff elongated narrow strip in the nature of a spear, bodkin, or prong element. This element may be made of pasteboard, plastic, metal or other suitable flexible material and may be either single-ply and extend but once along the backing member or may be doubled upon itself, one length serving to impale the shingled sheets or forms and the other serving to secure the prong and attached sheets to the backing member and also to perform a locking and sheet aligning function to be described presently.

The sheets or forms used in this improved system are ingeniously devised and constitute one of the novel and advantageous features of the invention, both in combination with the securing and supporting devices and as separate and useful articles of manufacture. Only three apertures are generally employed in the preferred embodiments of the invention.

As will be developed more fully in the detailed specification, one of the two essential or indispensable apertures is disposed closely adjacent one shingled edge of the sheet and may be of one of a wide variety of configurations, although certain preferred ones will be pointed out. The second essential opening or aperture is spaced further from the shingled edge of the sheet than the first named one and in alignment therewith in a generally parallel direction with respect to an adjacent rectilinear edge of the sheet. This second aperture is cut or punched with great care as to dimensioning and alignment, and is preferably not circular but rather rectilinear or angular, that is with respect to its points which are closest to the first mentioned aperture, when great accuracy of shingling is desired. The third aperture, which may be omitted in certain cases, is positioned at a substantially more remote position from the first aperture, and provides an anchoring expedient whereby the remote portion of the prong or prongs may interlock with the sheet and aid in preserving the alignment.

As the present specification develops, it will be readily seen that one of the important features of novelty of the present invention resides in the limiting of the number of apertures in each sheet to two, or a maximum of three.

Other objects and features of novelty will be apparent from the following specification when read in connection with the accompanying drawings in which certain embodiments of the invention are illustrated by way of example.

In the drawings:

Figure 1 is a view in perspective of a detached bundle of record sheets pertaining to a payroll program, one of the sheets being in process of assembly and all of the sheets ruffled and displaced somewhat for better illustration of the arrangement and functioning of the device;

Figure 2 is a view in perspective of one embodiment of the invention in which the shingled sheets are firmly bound in a folder and illustrates one preferred form of the invention;

Figure 3 is a view in longitudinal section through the assembly shown in Figure 2 taken on line 3—3 of that figure;

Figure 4 is a fragmentary plan view of one corner of the sheet assemblage of Figure 2;

Figure 5 is a fragmentary sectional view taken on line 5—5 of Figure 4;

Figure 6 is a fragmentary view of a novel form of sheet which functions very efficiently in this system of shingling;

Figure 7 is a broken plan view of a series of shingle filed sheets illustrating another embodiment of the invention;

Figure 8 is a fragmentary sectional view taken on line 8—8 of Figure 7;

Figure 9 is a fragmentary plan view of a novel sheet form adaptable for filing as illustrated in Figure 7;

Figure 10 is a broken plan view of a series of sheets shingle filed each with a very narrow exposed portion, according to another embodiment of the invention;

Figure 11 is a fragmentary sectional view taken on line 11—11 of Figure 10;

Figure 12 is a broken or fragmentary plan view of a novel sheet form which is used in the embodiment of the invention illustrated in Figure 10;

Figure 13 is a fragmentary view of a corner portion of a series of shingled sheets in accordance with a still further embodiment of the invention;

Figure 14 is a fragmentary sectional view taken on line 14—14 of Figure 13;

Figure 15 is a fragmentary view of a novel paper sheet usable in connection with the embodiment illustrated in Figure 13;

Figure 16 is a broken plan view of sheets shingle filed by the use of multiple prongs;

Figures 17, 18, 19 and 20 are fragmentary views of corners of sheets showing a variety of forms of cuts or perforations adaptable for use as the initial or end aperture;

Figures 21, 22 and 23 are fragmentary views of intermediate portions of sheets to be shingle filed and illustrating three variations in the type of cuts or perforations suitable for the second indispensable aperture;

Figures 24, 25 and 26 are fragmentary views of the remote corners of sheets indicating variant forms of aligning apertures through which the prongs may be inserted for anchoring or better maintaining the alignment of the shingled sheets;

Figure 27 is a fragmentary view of a series of thin strip-like sheets embodying the principles of the invention and illustrating a very simple and inexpensive form of prong;

Figure 28 is a fragmentary sectional view taken on line 28—28 of Figure 27;

Figure 29 is a fragmentary view of the end portion of one of the sheets or strips employed in the embodiment of the invention shown in Figure 27;

Figure 30 is a fragmentary view showing the upper portion of a series of shingled sheets wherein the binding prongs are disposed at an intermediate position instead of along one margin;

Figure 31 is a fragmentary view of a shingle file assembly of sheets having turned-over edges whereby the exposed portions comprise internal areas of the sheets rather than marginal areas;

Figure 32 is a fragmentary plan view of a corner of a sheet employed in the embodiment shown in Figure 31;

Figure 33 is a fragmentary view of the upper portions of a series of horizontally shingled sheets for exposure of multiple areas;

Figure 34 is a back view of the same assembly shown in Figure 33;

Figure 35 is a fragmentary sectional view taken on line 35—35 of Figure 33;

Figure 36 is a plan view of the upper portion of a sheet adapted for use in the systems illustrated in Figures 33-35 inclusive;

Figure 37 is a view in perspective of a binder usable as a backing sheet for the shingle filing systems illustrated herein and suggesting a means for anchoring one of the prongs thereto;

Figure 38 is a similar view showing a single sheet as the backing element;

Figure 39 is a similar perspective showing of a stub-like strip employed as a backing element for shingle file sheets according to the present invention; and Figures 40-44 inclusive are diagrammatic plan views showing various expedients for changing the amount of shingling exposure as applied to a preferred form of the invention.

Anyone skilled in the art of making and using business forms and equipment for handling them will immediately realize the application and advantages of the systems provided herein to many phases of business operations, only a few of which can be mentioned herein.

Accumulated record forms having columns or other significant areas on each of the component forms or sheets bearing data which are to be compared or analyzed by means of shingle filing, may be involved in general bookkeeping operations, time-keeping records, sales records, payroll programs, the preparation of periodic reports, and in many other operations.

In the suggested embodiment showing the general principles of the invention which is illustrated in Figure 1 of the drawings, there is disclosed a series of sheets or forms involved in a payroll system and in which horizontal areas at the top edge of each sheet carry the significant figures for comparison purposes. Therefore, the binding or supporting arrangement is preferably provided at the upper left-hand corner of the respective sheets, although in other embodiments it is differently located. In Figure 1 the bottom sheet with the uppermost exposed portion is indicated generally by the reference numeral 10 and the successive sheets up to and including the number used here for illustrative purposes are designated 11, 12, 13 and 14. Although the sheets are shown as being ruffled and slightly separated, the first four sheets are approximately in their bound position, while sheet 14 is being threaded and applied to the assemblage by the hand of the operator indicated at 15.

The upper exposed portions of the sheets which constitute a row of figures at the heads of vertical columns on the sheets are indicated at 10a, 11a, 12a, 13a and 14a.

Since Figure 1 comprises a rather generalized view of a typical assemblage, the details of the interlocking elements might best be discovered by reference to specific embodiments of the invention illustrated in certain of the later figures of the drawing. Therefore, it will suffice to indicate generally how the sheets shown in Figure 1 are assembled, without going into the variations in apertures or the means for obtaining the extraordinarily narrow exposed areas. The binding means comprises essentially, in the embodiment illustrated in Figure 1, a doubled strip of relatively stiff material such as pliant or flexible metal which is designated generally by the reference numeral 17 and comprises an upper prong portion 18 and a lower or underlying prong portion 19, the bend 20 in the prong occurring at the upper edge of the assemblage. The prong is so threaded through the two uppermost apertures in the sheet that it passes downwardly from the upper side of the sheet to the lower side thereof through the outermost aperture 22 and back from beneath, passing upwardly through the second aperture 24 in each case. The two essential apertures are spaced apart in a direction preferably perpendicular to the edge of the sheet adjacent the exposed portion and the space between the two apertures provides a web or flap portion 25.

The underneath prong portion 19 of the binder strip 17 passes from back to front of the several sheets through the third apertures 27 of the sheets and emerges as clearly shown at the lower left-hand corner of the assemblage in Figure 1.

It may be perceived even at this point of the description that the extent of the exposure of the portions 10a and 11a of the sheets is determined by the distance of the upper portion of the second aperture of a given sheet from the edge of the sheet; and this fact, which is an extremely important feature of the invention, will be developed in detail in connection with the various specific embodiments of the invention in which openings or apertures of various configurations will be described.

Referring now specifically to one embodiment of the invention, illustrated in Figures 2-6 of the drawings, it will be seen that the assemblage of sheets shingle filed according to the invention is designated generally by the reference numeral 30 and is bound into a folder 31 which comprises a backing sheet 32 and a cover flap 33 joined at the crease 34.

It will be well at this time to indicate that the backing arrangements may take a variety of forms, for example such as indicated in Figures 37, 38 and 39 of the drawings. In Figure 37 the same folder arrangement is shown as in Figure 2 in which the backing sheet 32 has a cover flap 33 hinged to it as at 34. For purposes of binding the folder into a ring binder or other storage device, registering openings 35 are provided in both the backing sheet and the top sheet as shown. One means for anchoring the back prong 19 of the binding strip 17 is shown in Figures 37, 38 and 39 whereby the prong 19 passes downwardly from its upper band behind the binder as at 37 up through an opening 38 along the face of the backing sheet 32 as at 39 downwardly through the opening 40 along the back of the backing sheet 32 as at 41 and up through the opening 42 to extend for a considerable length along the backing sheet 32 as at 43 and finally down through the opening 44 at the remote edge of the backing sheet. Similar perforations 35 are made in the single backing sheet arrangement of Figure 38 which is indicated at 32' in connection with the strip backing element 32" of Figure 39. In the same way the rear prong element 19 is threaded through the various openings 38, 40, 42 and 44 in these other forms. It will usually be found most useful to make the backing sheets or supports out of cardboard in the forms illustrated in Figures 37 and 38, although these backing elements may also be made of metal or any other suitable material as can also the narrow strip backing member 32" of Figure 39.

Returning now to the particular embodiment illustrated in Figures 2–6 of the drawings it will be readily observed from Figure 6 that the sheet 50 used in this embodiment is provided along its left-hand margin with a series of apertures or perforations which may be classified for convenience in describing the various embodiments as located at zones or positions Nos. I, II and III, the apertures in positions I and II being indispensable to the operation of the invention and the aperture in position III being of great convenience in association with the other elements but capable of being omitted in certain cases as, for example, where a single prong 18 is employed and no rear prong 19 used, or in cases where the sheets of strips are so narrow as to require securing apertures only at positions I and II.

The particular forms of these cuts or apertures will be described in detail, and various combinations of them may be employed, each having its own peculiar advantages in its particular position. Therefore, except as set forth in certain of the claims appended hereto, the specific associations of apertures as, for example, in Figure 6 are not to be taken in a limiting sense as respects the generic concept of the invention. The arrangement of apertures shown in Figure 6 has, however, been found to be of very great utility and efficiency of operation. In this form of the invention the aperture 51 at position No. I is circular. The aperture at position II comprises a circular perforation 55 with two upwardly diverging horn-like slits or cuts 56 and 57 issuing therefrom and terminating at points 58 and 59 at a selected distance from the edge 60 of the sheet and also from the edges of the aperture 51. More about the significance of these tips 58 and 59 later. The aperture 62 at position III is in this case of the same shape as the uppermost aperture 51.

The threading of the prong 18 in the assembling of this embodiment of the invention is most clearly shown in detail in Figures 3 and 4 of the drawings in which it will be seen that the prong 18 is threaded downwardly through the opening 51 in the first sheet 50A and then upwardly through the opening 55 in the same sheet, thus forcing flap or tab 65 to bend slightly upwardly. The second sheet 50B is then threaded upon the prong 18, the prong passing downwardly through its opening 51 and upwardly through its opening 55. As the sheet 50B is slid upwardly along the prong the upper edge 60 thereof passes beneath the flap or tab 65 until it abuts the ends 58 and 59 of the slits 56 and 57, these spaced slit ends being located a predetermined distance D from the upper edge 60 of the sheet in which they are formed. The points 58 and 59 are also disposed in horizontal alignment and are preferably spaced somewhat further apart in a horizontal direction than the width of an ordinary aperture used for filing purposes. This gives a broad abutment provision for not only determining with great precision the spacing of the edges 60 of the successive sheets to accurately delineate the exposed portions, but also serves to square the sheets to better advantage and tend to keep them in proper adjustment. The prong 18 proceeds downwardly through the successive apertures 51 and upwardly through the No. II apertures 55 in the successive sheets to be shingle filed.

As an added factor in preserving the alignment of the sheets the underneath prong 19 is at the same time brought back through the successive openings 62 of the sheets at position III and then, together with the lower end of prong 18, is passed downwardly through the opening 44 in the backing sheet 32.

To illustrate the versatility of this embodiment of the invention, attention is directed to the diagrammatic fragmentary views of the upper left-hand corner of certain forms which are illustrated in Figures 40–44 inclusive of the drawings. Although, to clearly bring out the construction and advantages appertaining to this embodiment, certain dimensions will be mentioned, it is to be clearly understood that these dimensions are not used in any limiting sense and other practicable dimensions may be employed without departing from the scope of the invention.

Since the arrangements illustrated in these figures are of the same character as the embodiment illustrated in Figures 2–6 of the drawings, the same or similar reference characters will be employed in designating the equivalent parts.

In Figure 40 of the drawings the sheet 50 is provided with a No. I aperture 51 which for the purposes of illustrative example may be ¼" in diameter. This aperture 51 may be spaced as close as ⅟₁₆" from the upper margin 60 of the sheet 50. The aperture in the No. II position has a basic preferably circular portion designated 55 from which extend the divergent slits or cuts 56 and 57, which are of a predetermined length, and in this instance, terminate at the points 58 and 59 which are in alignment with the horizontal diameter of the No. I aperture 51. This brings these abutment points 58 and 59 ³⁄₁₆" from the margin 60 and thus determines the shingling exposure as ³⁄₁₆", which is quite small as compared with the possibilities of other arrangements. For purposes of example, the apertures 51 and 55 are fixed at a center-to-center distance of ⅜" and the angle between the slits 56 and 57 is chosen at 72°.

With this illustration in Figure 40 as a possible practical minimum exposure for this type of device, there are at least four ways of increasing the exposure distance and these will be treated in the discussion of Figures 41–44 inclusive. For illustrative purposes, the wider exposure distance of ⁵⁄₁₆" has been arbitrarily chosen.

In Figure 41 the sheet 150 with an upper edge 160 is provided with a No. I aperture 151 and a No. II aperture 155 and the slits 156 and 157 all in the same relationship as in Figure 40. However, the two apertures have been displaced downwardly on the sheet as a unit, the distance between the upper margin of the aperture 151 from the sheet margin 160 being ³⁄₁₆" and the exposure distance from the points 158 and 159 being the desired ⁵⁄₁₆".

The second method of attaining the wider exposure is illustrated in Figure 42 of the drawings in which the aperture 251 and the aperture 255 are basically positioned on the sheet in the same way as that shown in Figure 40 of the drawings, but the cutting knives which form the horn-like slits of aperture 255 are shortened so that the lengths of the slits 256 and 257 are such as to bring the abutment points 258 and 259 down to the ⁵⁄₁₆" distance.

The increased overlap is obtained in the sheet 350 in Figure 43 by maintaining the apertures 351 and 355 in the same relative positions as they are in Figures 40 and 42 but changing the angularity of the slits 356 and 357 without, however, changing the length thereof from that shown in Figure 40, so as to bring the abutment points 358 and 359 down to the ⁵⁄₁₆" distance.

Finally, in Figure 44 of the drawings the sheet 450 has a No. I aperture 451 disposed in exactly the same position as the apertures 51, 251 and 351 of the previously described embodiments. Also, the No. II aperture 455 with its slits 456 and 457 is similar in actual dimensions to the ones shown in Figures 40 and 41, but the spacing center-to-center between the apertures has been increased the necessary distance to cause the abutment points 458 and 459 to occur at the desired ⁵⁄₁₆" distance from the upper margin 460 of the sheet.

There is illustrated in Figures 7, 8 and 9 an embodiment of the invention which employs openings or apertures in the form of half moons and the upper edge of the No. II aperture in this case is in the form of a straight line for maximum advantages in providing abutment points for the succeeding sheets and defining the controlling dimension D.

In this embodiment the successive sheets are designated 70a, 70b, 70c, 70d and the upper prong 19 is threaded downwardly through the No. I opening 72, behind the strap 74, and upwardly through the No. II opening 75 which has the upper straight edge 76. If desired for purposes of maintaining better alignment, a No. III opening may be provided which is indicated at 77 in the drawings. In this embodiment, while the lateral dimension of the aperture margin 76 at position II is not quite as wide as the tips of the horns of the No. II combined perforation and slit aperture in the earlier described embodiment, the width of the alignment aperture 77 at position No. III is such as to fairly snugly confine the prong 19 and prevent excessive lateral swing of the sheets from true alignment.

It has already been indicated that the distance between the upper margin of the No. II aperture and the adjacent edge of the sheet is the controlling dimension which determines the width of the exposed areas. By virtue of the present invention, this controlling distance can be made exceedingly small. In fact, by the use of reasonably strong papers (which prevent tearing of closely spaced apertures) and using a rather narrow aperture at No. I position and providing a mere slit or cut of appropriate configuration at position No. II, the applicant can reduce the controlling dimension D to about ⅛", and three times as many shingle forms can be used as in the case of the pegboard and ring binder shingling, the lower limit of which is ⅜". Although this ⅛" shingling is not useful in all cases where ordinary handwriting or typing must be viewed in the exposed areas, it provides a sufficiently wide exposed surface on which to inscribe given marks or signal marks for physical follow-ups of the records.

In Figures 10, 11 and 12 there is illustrated one preferred embodiment of the invention which attains these results. The sheet 80 in this case as shown in Figure 12 is provided with a rather narrow aperture 82 at the No. I position and in fact this narrow rectangular aperture may be reduced still further in vertical width if desired. The No. II aperture 85 is in fact a compound slit or cut comprising a substantially horizontal mid-portion 86 and the wing slits or horns 87 and 88 terminating in tips 89 and 90 which determine the controlling dimension D and which in this embodiment reduces this dimension to about ⅛". It will also be noted that due to the widely divergent nature of the angular slits 87 and 88 the points 89 and 90 are further apart than in some of the other embodiments, and thus provides a better alignment gauge or abutment for the successive sheets.

The assembled sheets are shown in Figure 10 as being numbered 80a, 80b, 80c and 80d and the prong 19 is threaded downwardly through the narrow slot 82 and upwardly through the central portion 86 of the cut 85 at the No. II position.

The lower anchoring slot at the No. III position, which aids in preserving the alignment, is shown at 92 as being of the half-moon type.

In Figures 13, 14 and 15 of the drawings there is shown an embodiment of the invention which employs a sheet generally designated at 100 in which the No. I and No. III slots are of the half-moon type and indicated respectively at 101 and 102. Here there is no need for providing an exceptionally narrow exposure controlling dimension D; therefore, the No. I aperture may be of fairly large dimensions and the wings 104 and 105 diverging upwardly from the horizontal slit 106 of the No. II aperture are disposed at a slightly different angle with the vertical axis of the openings. Any practicable angularity of inclined slits may be employed in providing these peculiarly shaped apertures.

Occasionally, for better securement of short forms on which space is not available for the third aligning aperture, the use of two sets of prongs 17 as indicated in Figure 16 may be desired. For convenience of illustration, in this embodiment, the same combination of apertures has been employed as in the embodiment illustrated in Figures 7–9 of the drawings in which openings 72 and 75 occupy the No. I and No. II positions respectively.

As previously noted, various combinations of aperture configuration may be employed at the three different stations. For indicating the wide choice (where special effects and greater degrees of accuracy of shingling are not absolutely necessary) various examples of apertures for the three different positions are suggested in certain of the following figures of drawings. In Figures 17, 18, 19 and 20 are shown apertures which will find particular favor in the No. I position besides the common circular opening. In Figure 17 the aperture 110 on the sheet 112 is of the half-moon type similar to the No. I apertures of Figures 7 and 15. In Figure 18 a slit aperture 114 is provided which is of the deep angular configuration exemplified by the No. II aperture of Figure 15. In Figure 19 the No. I aperture is shown at 116 on sheet 117 and is of the wide and flat configuration employed for the No. II position in the embodiment shown in Figures 10–12. In Figure 20 the sheet 118 is provided with a narrow rectangular aperture 120 just as in the case of the embodiment shown in Figures 10–12.

In Figures 21–23 there are illustrated preferred selections of apertures for the No. II position on the several sheets. In Figure 21, sheet 122 having a highly effective aperture 124 both in affording easy entry of the prong and for giving good abutment points for the next sheet, is shown. This aperture is the same as that one shown in the combination views of Figures 2–5 inclusive, and comprises a circular opening 125 with diverging horns 126 and 127. In Figure 22 a half-moon aperture 127 is cut at the No. II position on the sheet 128 as in the case of the embodiment shown on the sheet of Figure 9. Another choice of the No. II aperture is illustrated in Figure 23 where the sheet 130 is provided with a slit aperture 131 of the same configuration as the No. II aperture of Figure 15.

Finally, three forms of No. III aperture besides the circular one, are shown for positioning at the bottom of the sheets, in Figures 24, 25 and 26 of the drawings. In Figure 24 the half-moon type of aperture 132 is formed in the sheet 133 in a similar fashion to those illustrated in Figures 9, 12 and 15 of the drawings. In Figure 25 an aperture 135 is formed in the sheet 136 at the No. III position, this aperture being similar to the one employed at the No. II position in Figure 15. In Figure 26 a No. III aperture designated 138 is formed in the sheet 140 and comprises a circular opening 141 having the horns 142 and 143 similar to those used in Figures 2–6 inclusive at the No. II position. One possible basis for exercising a choice of Figure 24 in respect to the lower anchoring apertures might be the fact that the width of the aperture 32 is more nearly the same as the width of the prong 19 and thus may serve to prevent relative sidesway of the sheets and the prong from occurring, although the forms of the No. II aperture shown in Figures 25 and 26 might afford an easier threading of the prong.

Sometimes it is necessary or convenient to shingle file rather narrow strips of intelligence bearing papers and in Figures 27–29 inclusive one embodiment of such an arrangement is suggested. In this case the basic sheet or strip 150 has a rather narrow vertical direction and is provided with apertures only at the No. I and No. II positions, these apertures for purposes of illustration being of the half-moon type and indicated at 151 and 152. A rather simple form of spike or prong is illustrated in this case and this example of supporting means is not limited to this form of device but may be used in any of the others illustrated herein. This binder or prong element is designated 155 and has a prong portion 156 which enters the apertures and a T-head 157 which limits its insertion in the first aperture 151 of the higher sheet which is of course the bottommost in the shingled pile.

One advantage of this type of shingle filing over ring or clamp filing is the fact that the prong 17, 19 may be applied to the sheets at any desired point, the position not being limited to the margins of the sheets. This is exemplified in Figure 30 and the shingled sheets 160a, 160b and 160c are secured in overlapping position by the prong which passes through the No. I opening 165 and the No. II opening 166 in each sheet disposed at a central portion thereof.

In Figures 31 and 32 there is illustrated a form of the invention which affords separate analyses of data from two areas on each sheet, each such analysis being made from a separate set of copies of the forms. The sheets 170 in this case are cut away as at 171 at an upper corner and provided with a fold line 172 as shown, whereby data in the area 174 or in the area 175 may be presented for simultaneous viewing, the 174 area in one set of shingle sheets being exposed in the usual way and the 175 area in a set of sheets assembled as in Figure 31, the No. I openings designated 177 and the No. II openings designated 178 in which case being disposed just below the cut-out portion 171. Of course, the copies of the forms to be arranged for analysis or comparison of the areas 174 could be prepared in the ordinary way without the cut-out portion 171 and shingled with openings provided in the upper corner of the sheet where the cut-out portion in this connection occurs. This die-cutting and folding of the sheets can be used in any case where the data to be analyzed cannot appear in the immediate vicinity of an edge of the form. This separate shingling of more than one copy of a series of record forms on which all of the data to be analyzed can be written at one time, comprises a highly efficient and time-saving procedure.

In Figures 33–36 of the drawings there is illustrated an ingenious embodiment of the invention in which data written on the face of the form can be divided into two different exposed areas for making two different analyses in the same set of copies. This type of folded form cannot be used on the old types of pegboard and the present invention provides an exceedingly efficient means for attaining this purpose. In this case the sheet 180 illustrated in Figure 36 has a right-hand column 181 which, for example, can contain data to be compared by observing the front of the shingled pack of forms while the data inscribed on one of the left-hand columns 182 is adapted to be analyzed and compared from sheet to sheet by inspection of the reverse side of the pack of forms. This is effected by the provision of No. I and No. II openings in the usual way for horizontal shingling at 184 and 185. However, the left-hand portion of the sheet is provided with a crease line 187 and duplicate reversed No. III openings 188 and 189 are provided which will be brought into registry when the left-hand portion of the sheet is folded back along the line 187. From an inspection of Figure 33 of the drawings it will be seen how the respective columns 181a, 181b, 181c may be compared and similarly the reverse of the pack shown in Figure 34 illustrates how data in certain of the columns 182a, 182b and 182c can be simultaneously analyzed or compared.

It is to be emphasized that where the special improvement lies in the over-all shingling arrangement, as in the embodiments shown in Figures 16, 27, 30, 31, etc., the particular apertures may be of any suitable configuration and not limited to the examples selected for convenience of illustration in the drawings.

In summary, it will be readily understood from this specification that the present invention provides novel and convenient means for positioning and securing sheets or forms in shingle-filed relationship by the use of very simple and inexpensive means and by means upon which the sheets can be held for permanent or prolonged study or analysis without the necessity of removing them from the holders and retaining them in shingled relationship by the use of gummed tape or other inconvenient expedient. The low cost of the mechanical means employed in the present invention makes this utilization possible.

Further it will be realized that since the present invention affords a control of the amount of exposed area measured by the distance from a sheet edge to the upper edge portion of an aperture No. II and since that edge portion of aperture No. II can be located any distance down to 3/16" from the sheet edge (and even closer in the special case of Figures 10–12 inclusive), it follows that the invention gives an infinitely greater range of exposed areas than is possible with pegs and rings and the apertures limited to those devices. All of the apertures in forms to be shingled by pegs or rings must engage the pegs or rings and because all such apertures must be equi-distantly located with respect to each other, 3/8" or 1/2" center to center, the shingle controlling dimension of the exposed areas is thereby inherently limited to 3/8" or 1/2" or multiples thereof. In order to shingle a reasonably great number of sheets within a given over-all area, the controlling dimension of the exposed area seldom exceeds 3/4". Therefore, peg and ring devices are almost always limited to only two exposed areas, one width 3/8" and the other with 3/4" controlling dimension, whereas the present invention affords these dimensions and also practically any dimension in between.

Although by awkward effort and laborious counting of orifices and interfitting of sheets with relation to the punching mechanism, some of the novel arrangements produced by the present invention might be simulated by using sheets having a long series of punched openings extending the full length of the sheet, this sort of provision is, however, subject to many serious objections. For example, in the case of the popular eleven inch size form, 28 apertures of 3/8" center-to-center spacing are needed in the case of other shingling methods such as the pegboard and ring binder type. The provision of only two principal apertures, and at most only three apertures altogether, introduced by the present invention, attains the advantages of the employment of much simpler punching equipment which is less expensive to build and to maintain (the best quality punches and dies become faulty from wear in a surprisingly short time). Also, there are not nearly as many apertures to become faulty through incidental wear of the dies. Furthermore, the same punching equipment is usable in the present invention for all sizes of forms. A further advantage is that in the present systems there is no problem, such as would be present in the case of a continuous row of holes, in lining up for registering the apertures from sheet to sheet in the case of forms printed in a continuous strip. This is a difficult and costly problem for many printers who print with continuous presses every type of business forms from salesbooks to those which are to remain in continuous form as for peg and ring shingling. It is to be borne in mind that the punching of continuous forms and those which are printed continuously, can be satisfactorily done only while the forms are in a continuous strip; for example, punching through a folded pack or a succession of pasted unit sets gives inaccuracies which are entirely unacceptable. Also, neither the width nor the length of the commonly used business form sizes are evenly divisible by the ⅜" center-to-center dimension. Therefore, with a continuous row of holes of ⅜" center-to-center dimension over the full length of a form, a compensation is required between each two adjacent forms in the continuous strip. The amount of this compensation is different for every form size and to make sure unpunched areas do not exist (which would prevent engagement of the pegs or rings in that unpunched area) slots of various kinds and of the proper size for each form size, must be punched at each form area where one form joins the next form in the continuous strip.

On the other hand, the present invention, for the very reason that it does not require the continuous row of apertures can give the user the benefit of an exposed shingle area of a width as small as ⅛" and affords an almost infinite range of exposed dimensions, both of which advantages are inherently impossible in the case of the continuous uninterrupted row of equi-distant apertures.

Not only are the prong devices provided by the present invention of low cost, but the folders, binders or other supporting devices may also be of reasonable cost and these advantages of low cost, quick reference, and ready follow-up afforded by the device makes the arrangement useful to business and professional men of all kinds, whether doctors, dentists, insurance agents, and by all types of health and educational institutions as well as the many departments of manufacturing and servicing organizations. And, not only do these uses of the present device eliminate the need for paying the very high cost of metal trays and cabinets now in use for similar quick-reference and follow-up purposes, but they also exhibit important space-saving advantages because they are admirably adaptable to the universally used office files and filing methods.

Various changes and modifications may be made in the embodiments illustrated and described herein without departing from the scope of the invention as determined by the subjoined claims.

Having thus described the invention, what is claimed as new and desired to be secured by Letters Patent is:

1. A shingle filing arrangement comprising a series of rectangular sheets in partially overlapping position, with marginal portions of said sheets exposed at corresponding edges thereof; means securing the sheets of the arrangement together, comprising a pair of apertures in each sheet disposed near the said marginal edge and close to a side margin of the sheets, said pair of apertures consisting of an outer aperture spaced a predetermined short distance from said marginal edge, and an inner aperture spaced a further distance from said edge, a prong threaded through said first named aperture from the front face of the sheet to the opposite face and back through the second named aperture to the front face of the sheet, and thence through the openings in the next sheet in the same fashion, whereby the intermediate sheets are each impaled at two points by the prong between the similar twin impalements of the preceding and following sheets, said inner aperture comprising a central portion substantially the same width as said prong and a pair of outwardly diverging portions extending therefrom toward said marginal edge; the said marginal edge of each successive sheet lying beneath the adjacent portion of said prong and abutting spaced outer ends of said diverging portions of the second named aperture of the preceding sheet upon opposite sides of the prong where it emerges from said second named aperture; the width of the outer aperture approximating that of the prong and the width of the inner aperture being not more than four times the width of said prong, the widths of both the apertures and the prong being a minor fraction of the width of said sheets, in order to prevent unnecessary encroachment by the securing means upon the text or indicia bearing portions of the sheets; and a third aperture provided in each of the shingle filed sheets in substantial alignment with the two first named apertures, and thus close to said side margin, and at a point remote from said first two apertures in the direction away from said marginal edge, the width of the third aperture approximating that of the prong and a portion of the prong element being threaded snugly through said third aperture, the engagement of the prong with said remote third aperture serving to maintain the sheets against any possible rotation in their own planes which might occur.

2. A shingle filing arrangement comprising a series of rectangular sheets in partially overlapping position, with marginal portions of said sheets exposed at corresponding edges thereof; means securing the sheets of the arrangement together, comprising a pair of apertures in each sheet consisting of an outer aperture spaced a predetermined distance from said marginal edge, and an inner aperture spaced a still further distance from said edge; a prong threaded through said first named aperture from the front face of the sheet to the opposite face and back through the second named aperture to the front face of the sheet, and thence through the openings in the next sheet in the same fashion; the said marginal edge of each successive sheet lying beneath the adjacent portion of said prong and abutting outward portions of the second named aperture of the preceding sheet upon opposite sides of the prong where it emerges from said second named aperture; and a third aperture provided in each of the shingle filed sheets in substantial alignment with the two first named apertures but substantially removed from the first two named apertures in the direction from the said exposed marginal edge, a portion of the prong element being threaded through said third aperture, the prong element being doubled upon itself by means of a return bend intermediate its original length, one ply threaded through the two first named apertures as described, and the other threaded upwardly from back to front through the third named apertures of the successive sheets.

3. The arrangement set forth in claim 2 in which a backing sheet having apertures therethrough is provided for the shingle file sheets, said underneath ply of the prong being threaded through certain of said apertures in said backing sheet to secure it thereto and then up through the third aperture of the several sheets as described; the upper ply, after passing through the first two apertures of the sheets, and the lower ply both passing down from front to back through a final opening in the backing sheet adjacent the lower edge thereof and beyond the lower extent of the shingle file sheets.

References Cited in the file of this patent
UNITED STATES PATENTS

| | | |
|---|---|---|
| 1,714,517 | Moliard | May 28, 1929 |
| 2,295,951 | Jones et al. | Sept. 15, 1942 |

FOREIGN PATENTS

| | | |
|---|---|---|
| 269,215 | Great Britain | Sept. 29, 1927 |
| 712,575 | France | July 21, 1931 |